United States Patent
Arguello Gleason et al.

(10) Patent No.: US 10,336,272 B2
(45) Date of Patent: Jul. 2, 2019

(54) CLIP-ON SPACER, FRONT END MODULE AND METHOD

(71) Applicant: FORD GLOBAL TECHNOLOGIES, LLC, Dearborn, MI (US)

(72) Inventors: Daniel Alejandro Arguello Gleason, Coyoacan (MX); Stuart Cibulka, Beverly Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 95 days.

(21) Appl. No.: 15/332,705

(22) Filed: Oct. 24, 2016

(65) Prior Publication Data

US 2018/0111573 A1 Apr. 26, 2018

(51) Int. Cl.
| | |
|---|---|
| *B60R 19/52* | (2006.01) |
| *F16B 5/02* | (2006.01) |
| *F16B 5/06* | (2006.01) |
| *F16B 19/02* | (2006.01) |
| *B60R 19/24* | (2006.01) |
| *B60R 19/18* | (2006.01) |
| *B62D 25/08* | (2006.01) |
| *B62D 65/04* | (2006.01) |

(52) U.S. Cl.
CPC ............ B60R 19/52 (2013.01); F16B 5/0258 (2013.01); F16B 5/065 (2013.01); F16B 19/02 (2013.01); B60R 19/24 (2013.01); *B60R 2019/1886* (2013.01); *B60R 2019/525* (2013.01); *B62D 25/085* (2013.01); *B62D 65/04* (2013.01); *F16B 5/02* (2013.01)

(58) Field of Classification Search
CPC ........ B60R 19/52; F16B 5/065; F16B 5/0258; F16B 19/02

USPC ........................................................ 296/193.1
See application file for complete search history.

(56) References Cited

U.S. PATENT DOCUMENTS

| | | | | |
|---|---|---|---|---|
| 4,522,378 A | * | 6/1985 | Nelson | F16B 5/0258 16/2.1 |
| 4,597,603 A | | 7/1986 | Trabert | |
| 5,094,579 A | * | 3/1992 | Johnson | F02B 77/00 411/107 |
| 5,106,225 A | * | 4/1992 | Andre | F16B 5/0233 403/297 |
| 5,178,433 A | | 1/1993 | Wagner | |
| 5,865,500 A | | 2/1999 | Sanada et al. | |
| 6,499,714 B1 | * | 12/2002 | Wike | F16B 5/0258 248/632 |
| 7,987,937 B2 | | 8/2011 | Gonzalez-Salvador | |
| 8,424,173 B2 | | 4/2013 | Shiba | |

(Continued)

FOREIGN PATENT DOCUMENTS

| | | | | |
|---|---|---|---|---|
| DE | 19839710 A1 | * | 3/2000 | ............... F16B 5/02 |
| DE | 102010051038 A1 | | 5/2012 | |
| EP | 1937538 B1 | | 5/2016 | |

OTHER PUBLICATIONS

English Machine Translation of DE102010051038A1.

*Primary Examiner* — Jason S Morrow
(74) *Attorney, Agent, or Firm* — Jason Rogers; Vichit Chea; King & Schickli PLLC (57) ABSTRACT

A clip-on spacer includes a retainer having a receiver and a resilient clip and a spacer element having a tang and a bolt guide. A front end module includes a bolster carrier, a grille carried on the bolster carrier and a clip-on spacer fixed to the bolster carrier.

12 Claims, 6 Drawing Sheets

(56) References Cited

U.S. PATENT DOCUMENTS

| | | |
|---|---|---|
| 8,911,006 B2 | 12/2014 | Gillard et al. |
| 9,738,317 B2 * | 8/2017 | Iwamoto .............. B62D 27/065 |
| 2009/0180842 A1 * | 7/2009 | Johnson .................. F16B 5/065 |
| | | 411/101 |
| 2010/0162537 A1 * | 7/2010 | Shiba ...................... F16B 5/065 |
| | | 24/458 |
| 2018/0186305 A1 * | 7/2018 | Kanie ................. B60R 13/0206 |

* cited by examiner

CLIP-ON SPACER, FRONT END MODULE AND METHOD

TECHNICAL FIELD

This document relates generally to the motor vehicle production and equipment fields and, more particularly, to a clip-on spacer, a front end module incorporating that clip-on spacer and to a method of securing a front-end module to a bumper beam of a motor vehicle.

BACKGROUND

During motor vehicle production it is necessary to load the front end module of the motor vehicle utilizing a lift assist arm. More specifically, the lift assist arm holds the front end module and allows the assembly team member to position the front end module for mounting to the bumper beam, and more particularly, a bumper beam bracket, of the motor vehicle.

In order to accommodate manufacturing tolerances, a gap is provided between the bolster carrier of the front end module and the bumper beam bracket. In the past a relatively complicated compensation element, comprising a nut, a thread bush, a cage, a washer and a friction element, was utilized to compensate for tolerances and close this gap. More specifically, when a bolt was shot into the compensation element, the friction element, washer and thread bush would rotate freely causing the element to expand until the friction element contacted the mating surface of the bumper beam bracket.

Significantly, it should be appreciated that the prior art compensation element does not fill the gap until the bolt is shot. Occasionally, this would allow the front end module to rock downward when the lift assist arm was released, thereby potentially adversely affecting fit and finish.

This document relates to a new and improved clip-on spacer that is connected to the bolster carrier of the front end module. Advantageously, the new clip-on spacer fills the gap prior to shooting of the bolt, preventing rocking of the front end module when the lift arm is released so that front end fit is controlled and proper finish is achieved. Advantageously, the clip-on spacer disclosed and described in this document is integratable into existing design and requires no change to existing components.

SUMMARY

In accordance with the purposes and benefits described herein, a clip-on spacer is provided. That clip-on spacer comprises a retainer including a receiver and a resilient clip feature and a spacer element including a tang and a bolt guide. When assembled, the tang is engaged in the receiver. Advantageously, the clip-on spacer is a relatively simple and inexpensive to produce two-component device.

More specifically, the bolt guide extends through the tang. In addition, the receiver may comprise a cylindrical opening having an inner diameter $D_1$ while the tang has an outer diameter $D_2$ where $D_1<D_2$. As a result, a compression joint or friction fit is provided between the receiver and the tang.

The resilient clip feature may include two opposed V-shaped lugs. Those two opposed V-shaped lugs may open outward. Further, the spacer element many include a shoulder. When the spacer element is properly seated in the retainer, the retainer engages the shoulder.

The bolt guide may include a tapered entry communicating with a lumen extending through the spacer element. In addition, the retainer may be made from plastic while the spacer element may be made from metal.

In accordance with an additional aspect, a front end module is provided for a motor vehicle. That front end module comprises a bolster carrier, a grille carried on the bolster carrier and a clip-on spacer. The clip-on spacer is fixed to the bolster carrier. The clip-on spacer includes (a) a retainer including a receiver and a resilient clip feature and (b) a spacer element including a tang and a bolt guide. The tang is engaged in the receiver of the assembled clip-on spacer. Further, the bolt guide extends through the tang. The receiver may be a cylindrical opening having an inner diameter $D_1$ while the tang has an outer diameter $D_2$ where $D_1<D_2$ so as to provide a compression joint or friction fit between the receiver and the tang.

As previously noted, the resilient clip feature may include two opposed V-shaped legs. Those two opposed V-shaped lugs may open outward. Further, the spacer element may include a shoulder. In the assembled clip-on spacer, the retainer engages that shoulder.

The bolt guide may include a tapered entry communicating with a lumen extending through the spacer element. Further, the retainer may be made from plastic while the spacer element may be made from metal.

In accordance with still another aspect, a method is provided of securing a front end module to a bumper beam of a motor vehicle. That method may comprise the steps of (a) positioning the front end module over the bumper beam by means or use of a lift assist arm and (b) filling a gap between a bolster carrier on the front end module and a bumper beam bracket on the bumper beam with a spacer fixed to the bolster beam carrier so as to prevent rocking of the front end module with respect to the bumper beam.

The method may further include the step of positioning a bolt through the bumper beam bracket and a bolt guide in the spacer in order to secure the bolster carrier on the front end module with the bumper beam bracket on the bumper beam. Still further, the method may include the step of engaging the bolt with a weld nut fixed to the bolster carrier.

In the following description, there are shown and described several preferred embodiments of the clip-on spacer and the front end module. As it should be realized, the clip-on spacer and the front end module are capable of other, different embodiments and their several details are capable of modification in various, obvious aspects all without departing from the clip-on spacer and front end module as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the clip-on spacer and the front end module and together with the description serve to explain certain principles thereof.

Reference will now be made in detail to the present preferred embodiments of the clip-on spacer and front end module, examples of which are illustrated in the accompanying drawing figures.

DETAILED DESCRIPTION

Figure 1:
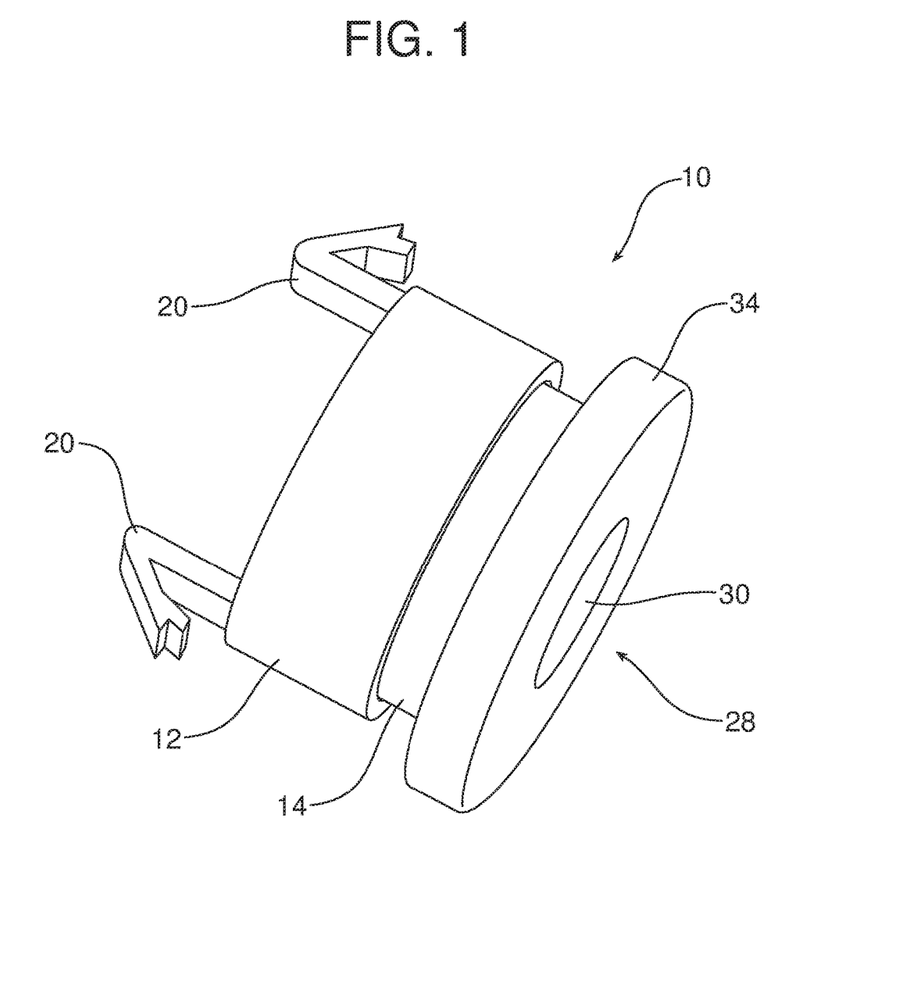
FIG. 1 is a perspective view of the assembled clip-on spacer including a retainer and a spacer element.
Figure 1A:
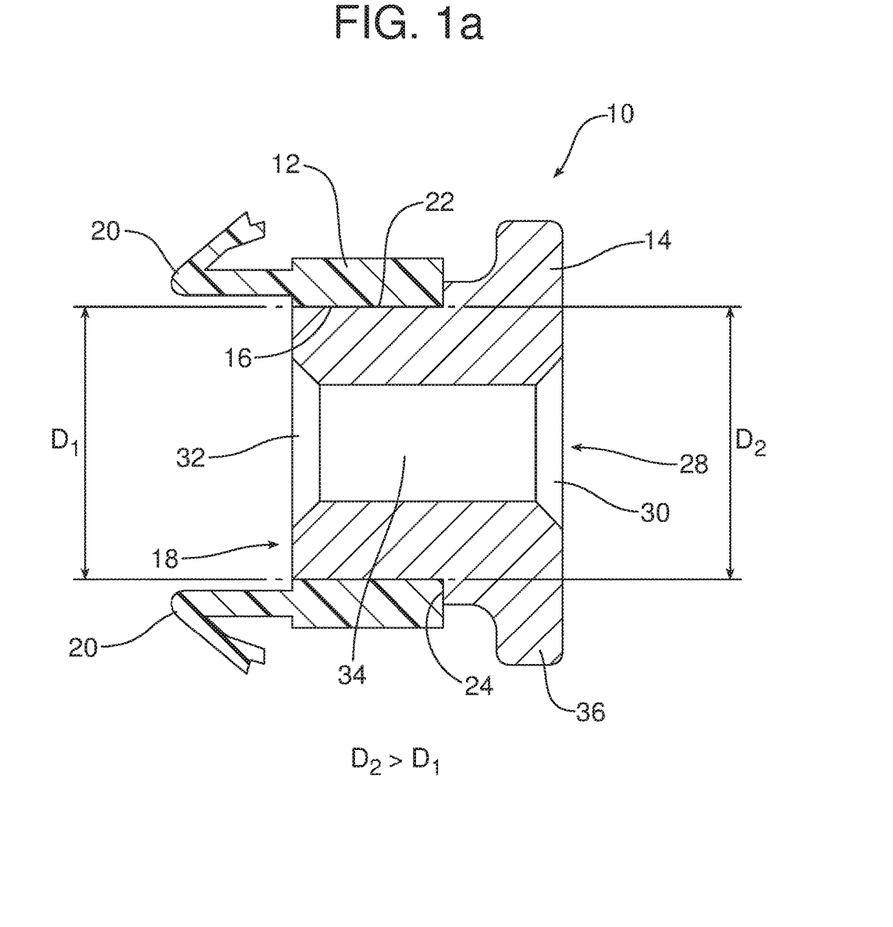
FIG. 1a is a cross-sectional view of a clip-on spacer clearing showing the bolt guide that extends through the spacer element of the clip-on spacer.

Reference is now made to FIGS. 1 and 1a illustrating the clip-on spacer 10. The clip-on spacer 10 includes a retainer 12 and a spacer element 14. Thus, it should be appreciated that the clip-on spacer 10 is a two-piece assembly of relatively simple and inexpensive construction.

In the illustrated embodiment, the retainer 12 includes a cylindrical sidewall 16 that defines a receiver 18. That receiver 18 comprises a cylindrical opening having an inner diameter $D_1$.

A resilient clip feature 20 is carried on the sidewall 16. In the illustrated embodiment, the resilient clip feature 20 comprises two opposed V-shaped lugs that open outward. The retainer 12 may be molded from an appropriate plastic material and, accordingly, is very inexpensive to produce.

The spacer element 14 includes a tang 22 that has an outer diameter $D_2$. The inner diameter $D_1$ of the cylindrical opening/receiver 18 is slightly less than the outer diameter $D_2$ of the tang 22. When the clip-on spacer 10 is assembled, the tang 22 of the spacer element 14 is inserted into the receiver 18 of the retainer 12 so as to provide a compression joint or friction fit between the receiver and the tang.

As should be further appreciated from viewing FIGS. 1 and 1a, the spacer element 14 includes a shoulder 24 that extends continuously around the spacer element at the end of the tang 22. When the spacer element 14 is fully seated in the retainer 12, the end of the sidewall 16 engages the shoulder 24.

The spacer element 14 also includes a bolt guide 28 which extends completely through the spacer element 14 and the tang 22. In the illustrated embodiment, the bolt guide 28 includes a tapered entry 30 and a tapered exit 32 to communicate with a lumen 34 extending through the spacer element 14.

The spacer element 14 may be made from an appropriate metal material such as steel. The head 36 of the spacer element 14 extending from the shoulder 24 to the tapered entry 30 may be made of any appropriate size in order to compensate for any manufacturing tolerance as necessary to provide the proper fit and finish to a completed assembly.

Figure 2:
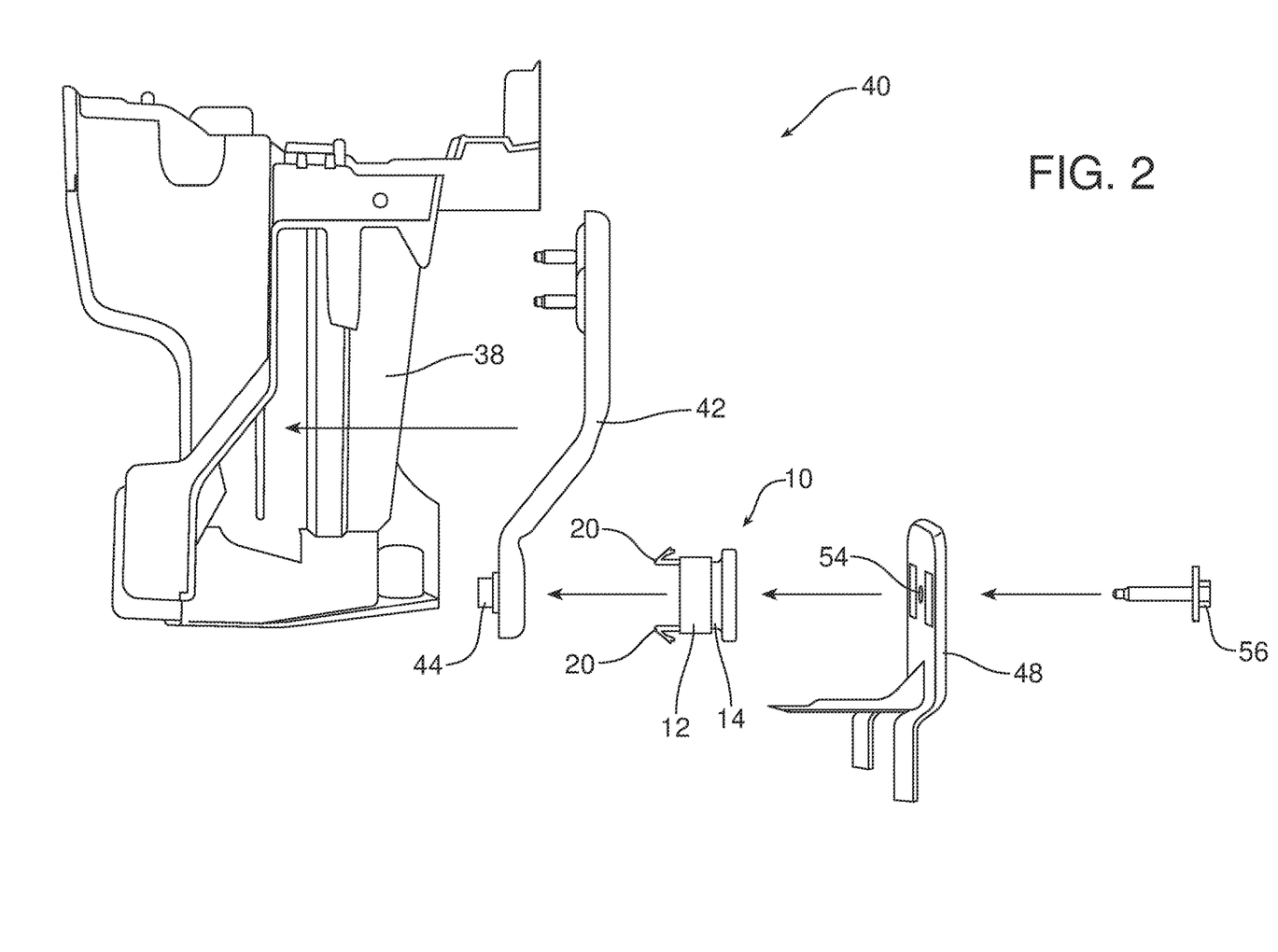
FIG. 2 is an exploded perspective view illustrating the bolster carrier, the latch bracket that is incorporated as an integral part of the bolster carrier, the bumper beam bracket that is secured to the bumper beam, the spacer that is clipped onto the latch bracket of the bolster carrier in order to eliminate the gap between the bolster carrier and the bumper beam bracket during front end module loading and the bolt that is shot through the bolt guide of the spacer to secure the bolster carrier and bumper beam.
Figure 3:
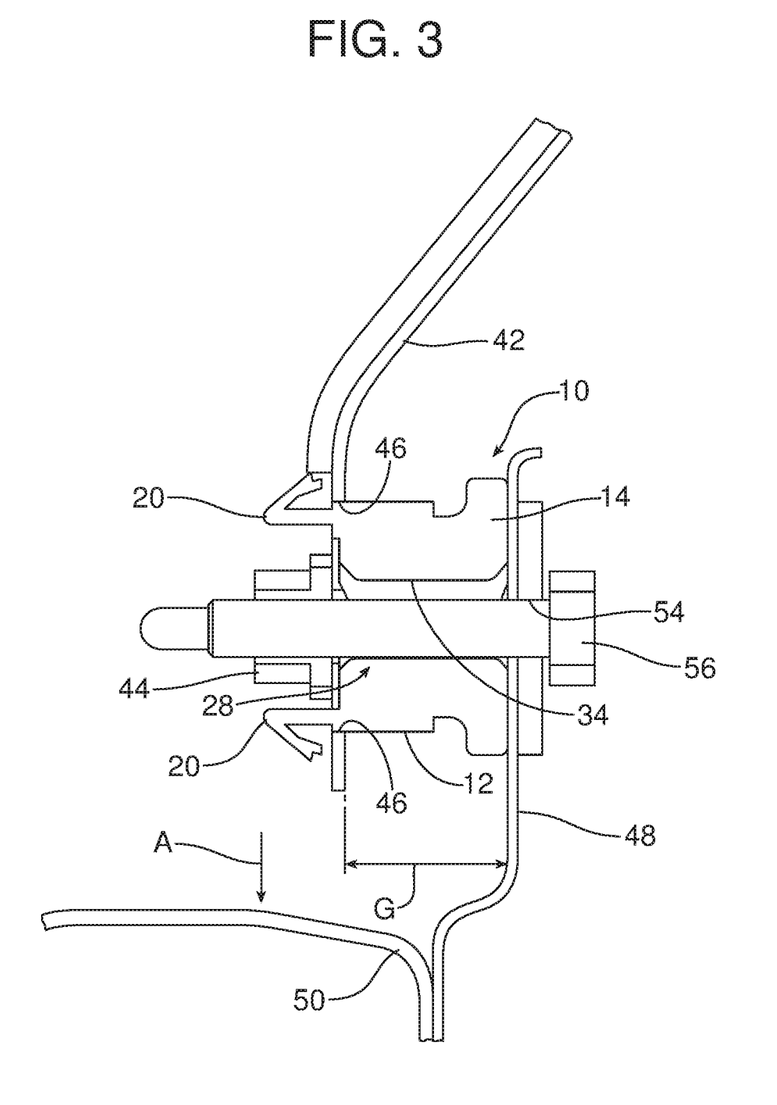
FIG. 3 is a detailed cross-sectional view illustrating the final assembly with the bolt securing the components together.

Reference is now made to FIGS. 2 and 3 illustrating one possible application of the clip-on spacer 10. FIG. 2 illustrates a bolster carrier 38 which forms a part of a front end module 40 of a motor vehicle (see also FIGS. 4 and 5). The bolster carrier 38 incorporates a latch bracket 42 having a weld nut 44. The clip-on spacer 10 is secured by means of the resilient clip feature 20 to the latch bracket 42 of the bolster carrier 38. More specifically, as best illustrated in FIG. 3, the individual V-shaped lugs of the resilient clip feature 20 are each received and engaged in apertures 46 provided in the latch bracket 42.

More specifically, the lugs of the resilient clip feature 20 bend as necessary to allow entry into the apertures 46 and then spring back into their original position through resilient memory so as to secure the retainer 12 in position on the latch bracket 42. As further illustrated in FIG. 3, the clip-on spacer 10 is sized and shaped to fill the gap G provided between the latch bracket 42 of the bolster carrier 38 and the bumper beam bracket 48 carried on the bumper beam 50. Once the front end module 40 is properly positioned over the bumper beam 50 by means of the lift assist arm 52 (see FIG. 4), the bolt guide 28 in the spacer element 14 is aligned with the bolt receiving aperture 54 and the bumper beam 50. The bolt 56 is then shot through the bolt aperture 54 and the bolt guide 28 of the clip-on spacer 10, so that the bolt is directed into engagement with the weld nut 44 so as to allow tightening. Once tightened, the bolt 56 functions to secure the front end module 40 to the bumper beam 50 through the latch bracket 42, clip on spacer 10 and bumper beam bracket 48.

Figure 4:
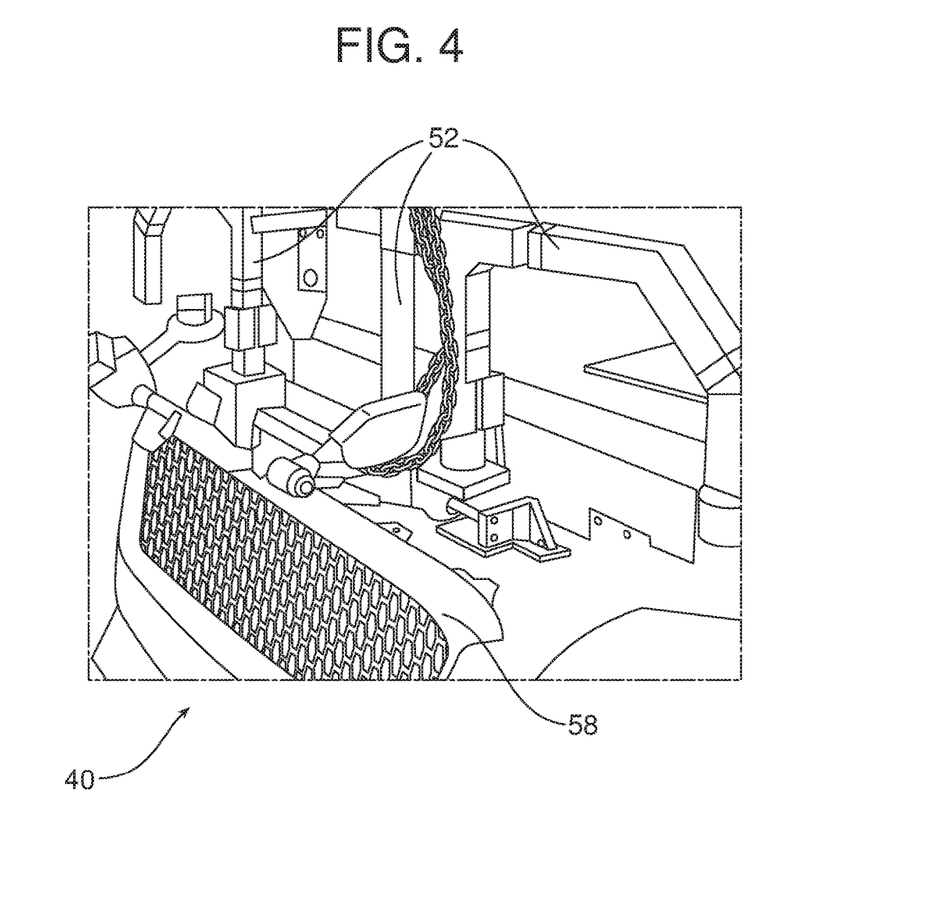
FIG. 4 is a perspective view illustrating the lift assist arm holding the front end module during loading onto the motor vehicle undergoing assembly.
Figure 5:
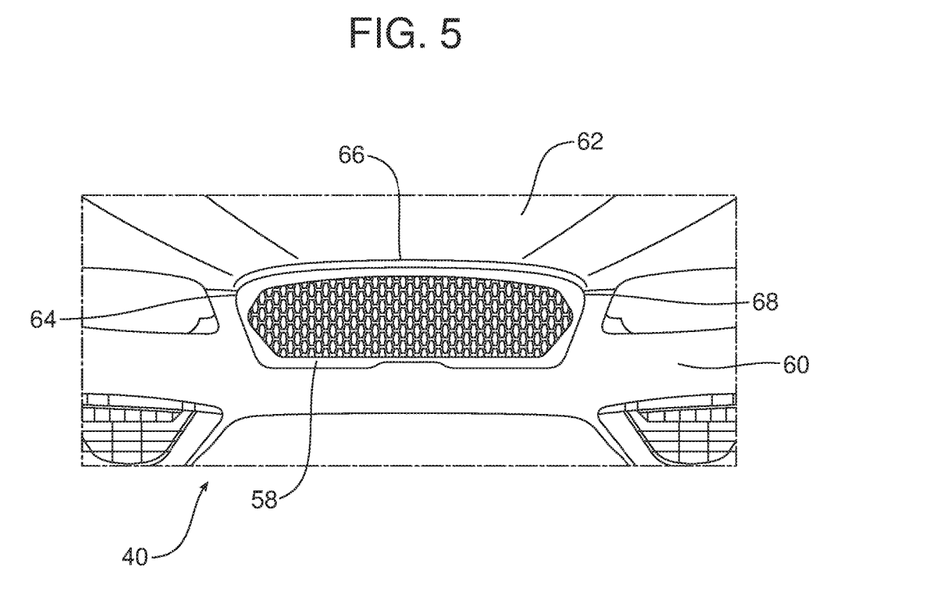
FIG. 5 is a front end view illustrating points of improved fit and finish provided as a result of the use of the clip-on spacer as described herein.

Consistent with the above description, a method is provided of securing a front end module 40 to a bumper beam 50 of a motor vehicle. That method comprises positioning the front end module 40 over the bumper beam 50 by means of the lift assist arm 52 as illustrated in FIG. 4. Further, the method includes filling the gap G between the bolster carrier 38 and, more particularly, the latch bracket 42 that forms a portion of the bolster carrier 38, and the bumper beam bracket 48. Advantageously, by filling the gap G, the clip-on spacer 10 effectively prevents any rocking of the front end module 40 with respect to the bumper beam 50 in the direction of action arrow A as illustrated in FIG. 3. This ensures better fit between the grille 58 of the front end module 40 with the front fascia 60 and hood 62 of the motor vehicle at, for example, the points 64, 66 and 68 illustrated in FIG. 5.

The method also includes the step of positioning the bolt 56 through the bumper beam bracket 48 and the bolt guide 28 of the clip-on spacer 10 in order to secure the bolster carrier 38 of the front end module 40 with the bumper beam bracket 48 on the bumper beam 50. As also shown, the method includes engaging the bolt 56 with the weld nut 44 that is fixed to the latch bracket 42 of the bolster carrier 38.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A clip-on spacer, comprising:
a retainer including a receiver and a resilient clip feature; and
a spacer element including a tang and a bolt guide, said tang being engaged in said receiver, wherein said bolt guide extends through said tang, and wherein said receiver is a cylindrical opening having an inner diameter $D_1$ and said tang has an outer diameter $D_2$ where $Di<D2$ so as to provide a friction fit between said receiver and said tang.

2. The clip-on spacer of claim 1, wherein said resilient clip feature includes two opposed V-shaped lugs.

3. The clip-on spacer of claim 2, wherein said two opposed V-shaped lugs open outward.

4. The clip-on spacer of claim 3, wherein said spacer element includes a shoulder and said retainer engages said shoulder.

5. The clip-on spacer of claim 4, wherein said bolt guide includes a tapered entry communicating with a lumen extending through said spacer element.

6. The clip-on spacer of claim 5, wherein said retainer is plastic and said spacer element is metal.

7. A front end module for a motor vehicle, comprising:
a bolster carrier;
a grille carried on said bolster carrier; and
a clip-on spacer fixed to said bolster carrier, said clip-on spacer having (a) a retainer including a receiver and a resilient clip feature and (b) a spacer element including a tang and a bolt guide, said tang being engaged in said receiver, wherein said bolt guide extends through said tang, and wherein said receiver is a cylindrical opening having an inner diameter $D_1$ and said tang has an outer diameter $D_2$ where $D_1<D_2$ so as to provide a friction fit between said receiver and said tang.

8. The front end module of claim 7, wherein said resilient clip feature includes two opposed V-shaped lugs.

9. The front end module of claim 8, wherein said two opposed V-shaped lugs open outward.

10. The front end module of claim 9, wherein said spacer element includes a shoulder and said retainer engages said shoulder.

11. The front end module of claim 10, wherein said bolt guide includes a tapered entry communicating with a lumen extending through said spacer element.

12. The front end module of claim 11, wherein said retainer is plastic and said spacer element is metal.

* * * * *